(12) United States Patent
Durif

(10) Patent No.: US 8,387,671 B2
(45) Date of Patent: Mar. 5, 2013

(54) PURGE VALVE FOR MOUNTED ASSEMBLY

(75) Inventor: Pierre Durif, Enval (FR)

(73) Assignees: Campagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 288 days.

(21) Appl. No.: 12/663,489

(22) PCT Filed: Jun. 3, 2008

(86) PCT No.: PCT/EP2008/056845
§ 371 (c)(1),
(2), (4) Date: May 20, 2010

(87) PCT Pub. No.: WO2008/148757
PCT Pub. Date: Dec. 11, 2008

(65) Prior Publication Data
US 2010/0224254 A1  Sep. 9, 2010

(30) Foreign Application Priority Data
Jun. 6, 2007 (FR) .................................. 07 04038

(51) Int. Cl.
*B60C 29/02* (2006.01)
(52) U.S. Cl. .................... 152/415; 251/324; 137/224
(58) Field of Classification Search .............. 152/415, 152/416, 417, 418, 427; 137/224; 251/324; 141/65
See application file for complete search history.

(56) References Cited

U.S. PATENT DOCUMENTS

| | | | |
|---|---|---|---|
| 4,046,163 A | 9/1977 | Novak | |
| 4,765,385 A * | 8/1988 | McGeachy | 152/416 |
| 5,556,489 A * | 9/1996 | Curlett et al. | 152/418 |
| 6,408,913 B1 | 6/2002 | Caretta et al. | |
| 6,948,516 B1 * | 9/2005 | Williams | 137/224 |
| 7,073,527 B1 * | 7/2006 | Freire Teiga | 137/226 |
| 2007/0151648 A1 * | 7/2007 | Loewe | 152/419 |

FOREIGN PATENT DOCUMENTS

| | | |
|---|---|---|
| DE | 37 25 406 | 3/1989 |
| DE | 39 26 391 | 2/1991 |

* cited by examiner

Primary Examiner — Kip T Kotter
(74) Attorney, Agent, or Firm — Cozen O'Connor

(57) ABSTRACT

A purge valve for a mounted assembly for a vehicle consisting of a wheel comprising a rim and of a tire, the valve comprising a body associated with the rim and a piston able to move with respect to the body between a closed position and a purge position and the valve being normally closed. The opening of the valve is obtained by the moving of the piston into the space radially external to the rim, the opening being obtained by action of a control force on the piston, exerted from the space radially internal to the rim, and provided by compressed air led from the space radially internal to the rim to the radially interior surface of the piston and the compressed air led from the space radially internal to the rim to the radially interior surface of the piston being at a pressure lower than or equal to that of the mounted assembly.

11 Claims, 4 Drawing Sheets under 35 USC §371 of application No. PCT/EP2008/056845, filed on Jun. 3, 2008.
PURGE VALVE FOR MOUNTED ASSEMBLY

RELATED APPLICATIONS

This is a U.S. national stage under 35 USC §371 of application No. PCT/EP2008/056845, filed on Jun. 3, 2008.

This application claims the priority of French application Ser. No. 07/04038 filed Jun. 6, 2007, the entire content of which is hereby incorporated by reference.

FIELD OF THE INVENTION

The present invention relates to a purge valve for a mounted assembly for a vehicle, consisting of a wheel comprising a rim and of a tire, the mounted assembly being intended to be fitted to a heavy vehicle or plant of the civil engineering works type.

Although not limited to this type of application, the invention will be described more specifically with reference to tires of vehicles of the dumper type operating in mines and having an axial width in excess of 18 inches.

BACKGROUND OF THE INVENTION

There are two customary ways of embodying the rim of such mounted assemblies. These rims are either drop-centre rims with tapered bead seats inclined with respect to the axis of rotation of the assembly by an angle of 5° or 15°, or flat base rims or almost-flat base rims with seats inclined either at 0° or at 5° with respect to the axis of rotation.

Rims known as flat base rims have a mounting well the diameter of which is markedly less than the nominal diameter of the rim. This inside diameter of the rim may be considered by users to be too small because it does not, for example, make it possible to select brake drums of dimensions suited to effective braking of vehicles that are becoming increasingly powerful in relation to their weight.

As a result, these rims are commonly used for mounted assemblies intended for vehicles of the passenger vehicle and/or heavy goods vehicle type, but are used far less, if at all, for other types of vehicle such as, for example, site plant and civil engineering works vehicles.

To create a mounted assembly, particularly one of the "tubeless" type, a flat base rim needs there to be at least one removable lateral ring, one locking ring and a seal, and obviously the flat base rim that has a fixed flange on the opposite side to the side on which the parts are removable. Indeed the dimensions of the wheels of the vehicles and those of the tires, particularly the stiffness of the bottom regions, means that the said wheels have to be produced in several parts so that the tire can be mounted on a rim. At least three parts are therefore needed. In most cases though, the number of parts needed is greater than three and may sometimes be as much as six parts for large sizes of tires, not to mention the parts needed to fix the wheels to the vehicle. With the exception of the seals which are made of rubber, the parts of a rim are made of metal, and are therefore heavy, bulky and difficult to handle. It then follows that fitting and removing large and very large tires are difficult and lengthy operations. Fitting and/or removing a wheel equipped with such a tire requires the vehicle or the plant to be taken out of action for a not insignificant length of time which is therefore to the detriment of the productivity desired in the use of these vehicles.

Patent Application WO 00/71365 describes a technique for simplifying the fitting of tires, these being mounted directly on the hub, which then acts as a rim. Independent mounting rings then act as rim seats and are held in place by blocking rings which are secured to the hub notably using complementary profiles. With this technique, the locking ring is made up of a vulcanized rubber compound reinforced with and coating a reinforcing ring that is circumferentially elastic and radially resistant to compression.

A technique such as this is highly attractive because it makes it possible to eliminate the phases of mounting on a rim and fixing of a wheel to the vehicle, the tires being mounted directly on the hub via the mounting rings and locking rings. Furthermore, because the number of parts is greatly reduced, the phases of handling these elements are simpler.

However, whether using this latter technique or whether the tires are associated with wheels made up of several parts, when it is necessary to change a tire or to swap two tires around on the vehicle, a step of removing the wheel and/or the tire is always required; this involves deflating the tire, something which is indispensable for changing a tire, and practically indispensable, at least in part, when swapping mounted assemblies around, in order to reduce weight.

The time taken to deflate a 59/80R63 tire fitted to a vehicle of the dumper type is longer than thirty minutes, which means that, in order to swap around all the tires on the vehicle, a combined deflation time of at least two hours is needed.

Given that in a mine, a work cycle corresponding to the transportation of a full dumper body by a vehicle of the dumper type is usually shorter than this 30-minute time, it is clearly evident that the time spent working on the tires has a direct and significant influence on the productivity of the vehicles.

There is therefore in particular a desire to reduce the time taken to deflate such tires.

Tires for civil engineering works vehicles, such as the vehicles used in mines, for example of the dumper type, are usually inflated to a pressure of between 4 and 10 bar for customary loads and sizes.

The current deflation techniques involve freeing the internal part of the inflation valve in order to allow the air to escape. Shortening the deflation time could involve increasing the dimension of the current inflation valve systems, but their design would then become problematic and the flow rates caused by the pressures and the volume of air in this type of tire would endanger the operator who has to free the internal part of the valve.

Existing valves of the butterfly, spool or check valve type, of suitable sizes have been envisaged, but they present various disadvantages. On the one hand, they are too bulky to be installed on certain vehicles and, on the other hand, the maintenance of these valves requires full disassembly. Maintenance has to be taken into consideration because as the air escapes from the mounted assembly, it carries with it particles such as residues of corrosion coming from the wheel, fragments of tire, if the latter is deteriorating, and also liquids resulting from condensation and from the specific products intended to combat corrosion.

In the course of their studies and in particular when looking into creating the mounted assembly comprising large-sized tires, particularly tires the axial width of which is in excess of 18 inches, intended to be fitted to vehicles of the dumper type, increases in the productivity of which are endlessly being desired, the inventors thus set themselves an object of improving the times taken to deflate the tires.

SUMMARY OF THE INVENTION

This object was achieved according to one aspect of the invention by a purge valve for a mounted assembly for a vehicle consisting of a wheel comprising a rim and of a tire, the valve comprising a body associated with the rim and a piston able to move with respect to the body between a closed position and a purge position, the valve being normally closed, the opening of the valve being obtained by the moving of the piston into the space radially external to the rim, the opening being obtained by action of a control force on the piston, exerted from the space radially internal to the rim, and provided at least in part by compressed air led from the space radially internal to the rim to the radially interior surface of the piston and the compressed air led from the space radially internal to the rim to the radially interior surface of the piston being at a pressure lower than or equal to that of the mounted assembly.

What is meant by "axial" is a direction parallel to the axis of rotation of the mounted assembly, and "radial" means a direction that intersects the axis of rotation of the mounted assembly and is perpendicular thereto. The axis of rotation of the mounted assembly is the axis about which it turns in normal use.

A circumferential plane or circumferential sectioning plane is a plane perpendicular to the axis of rotation of the mounted assembly. The equatorial plane or circumferential mid-plane is the circumferential plane that passes through the centre or crown of the tread of the tire and which divides the tire and/or the mounted assembly into two halves.

A radial plane is a plane which contains the axis of rotation of the mounted assembly.

The longitudinal direction of the tire, or circumferential direction, is the direction corresponding to the periphery of the tire and defined by the direction in which the tire and/or the mounted assembly runs.

Within the meaning of the invention, the mounted assembly encompasses any type of tire/wheel assembly, irrespective of the type of wheel or rim, and in particular, mounted assemblies like those mentioned hereinabove and described in patent application WO 00/71365.

The purge valve thus defined according to the invention can be sized to make it possible to reduce the time taken to deflate a tire. Specifically, as the issue here is no longer that of adapting a conventional inflation valve to specific conditions of deflation by an intervention corresponding to the removal of an internal part of a valve, it has been possible to design the valve according to the invention which can be opened without direct intervention on the part of an operator.

A first embodiment provides for the ratio of the area of the control surface to the area of the radially exterior surface of the piston to be greater than or equal to 110%. Because the area of the control surface, which, within the meaning of the invention, corresponds to the area of that surface of the piston to which the control force is applied, is greater than the area of the radially exterior surface of the piston, that is to say than the area of the surface of the piston in contact with the inflation air of the mounted assembly, the pressure of the compressed air that exerts the control force can be chosen to be less than or equal to that of the inflation pressure of the mounted assembly while at the same time making it possible to obtain the radially outward movement of the piston of the purge valve, thus thereby causing the said valve to open.

A second embodiment also anticipates for the control force to be increased by a mechanical and/or hydraulic and/or electrical device. Leaving aside the ratio of the area of the control surface to the area of the radially exterior surface of the piston, additional devices advantageously controlled by the compressed air applying the control force to the control surface of the piston may, according to this second embodiment, increase the said control force. These may, for example, be mechanical systems of the lever arm type. Electrical devices such as, for example, an electromagnet, may also contribute to the control force.

The two embodiments mentioned hereinabove can be combined.

According to an embodiment of the invention, the purge valve is fixed to the rim base such that the air is discharged into the space axially between the wheels of the vehicle. With such an embodiment, the air is discharged into a zone that is relatively enclosed by the underside of the truck, the ground and the solid parts of the wheels. In the case of twin wheels, for example on the rear axle of a vehicle, the air can thus be discharged from each of the mounted assemblies into the space between the twin wheels.

According to the abovementioned embodiments of the invention, the compressed air, which applies the control force that leads to the opening of the purge valve, may be carried by a duct, such as a rigid tube, secured to the wheel or wheels, and one end of which is fixed to the radially interior part of the purge valve in order to carry the said compressed air as far as the radially interior surface of the piston and of which the other end is accessible to an operator in order to connect a compressor. This other end, accessible to an operator, is advantageously situated in the space axially exterior to the wheels, that is to say advantageously outside of the zones in which the air will be discharged, so as to limit the deflation-linked risks to an operator.

An advantageous alternative form of the invention anticipates that, in its open position, the valve creates an annular discharge section within the space radially external to the rim in the tire cavity. According to this alternative form of the invention, for a given overall air discharge cross section, the width of the opening is limited and thus makes it possible to prevent any debris contained in the mounted assembly and of dimensions greater than this width of opening from passing through. This alternative form of embodiment of the invention further enhances the safety aspect of the deflation by eliminating the large-diameter particles that could be carried along during deflation. This also results in less soiling of the purge valve.

According to a first embodiment of the invention, the purge valve releases the air into the space radially internal to the rim through an orifice.

For preference, the orifice has at least one characteristic dimension shorter than 10 mm. What is meant within the meaning of the invention by the characteristic dimension of an orifice is a dimension that characterizes the orifice, for example the diameter in the case of an orifice of circular cross section, or, for example, the length, width or height in the case of an orifice of a different cross section.

According to other embodiments of the invention, the purge valve releases the air into the space radially internal to the rim through at least two orifices. Increasing the number of air outlet orifices may also make it possible to filter out any debris carried along during deflation, it being possible for the diameter of the orifices to decrease and then the number of them increases. Increasing the number of orifices may also contribute towards reducing noise.

The total cross section of the orifice or orifices is advantageously at least equal to the cross section formed by the opening of the piston within the cavity of the mounted assembly in order to minimize pressure drops during the flow of air through the purge valve.

According to one advantageous embodiment of the invention, the purge valve comprises a control system for moving the piston into the purge position as soon as the tire pressure exceeds a threshold pressure.

Such an embodiment of the invention consists in providing a control system which would trigger the opening of the purge valve once a predetermined threshold pressure is reached.

According to a first alternative form of this embodiment of the invention, the purge valve comprising a compressible means ensuring the normally-closed position, the said purge valve comprises a control system of the passive type and the tire pressure keeps the valve open until a pressure defined by the compressible means is reached.

According to a second alternative form of this embodiment of the invention, the said purge valve comprises a control system of the active type and the tire pressure keeps the valve open via an operator control.

In the case of the first alternative form consisting of a passive control system, the inventors propose to utilize the tire pressure in order to act directly on the purge valve and cause it to open.

One embodiment of the invention includes a device such as, for example, a diaphragm valve calibrated to rupture at the predefined pressure threshold and to open a passage for the air from the cavity of the mounted assembly towards the radially interior part of the piston of the purge valve through a duct such as a rigid pipe. A device such as this is advantageously associated with a non-return valve to prevent an undesirable pressure being exerted, for example, on the diaphragm valve when the purge valve is open under the effect of an operator control pressure.

In the case of the second alternative form consisting of an active control system, the inventors are also proposing to utilize the tire pressure to act directly on the purge valve and cause it to open, but this time using a device controlled by the operator, the said device being, for example, provided on a duct that connects the cavity of the mounted assembly to the purge valve. The way in which the purge valve operates, and more particularly the way in which it opens, is/are then similar to the passive control system scenario.

According to another alternative form of this embodiment of the invention, whereby the purge valve comprises a control system for moving the piston into the purge position as soon as the tire pressure exceeds a threshold pressure, the said purge valve combines a control system of the active type and a control system of the passive type. It is then possible to govern the tire pressure either by deliberate action when, for example, the operator is aware that a threshold pressure value is being neared and/or exceeded or by an automatic action by a passive-type system.

In the case of the active and/or passive control systems that utilize the pressure of the mounted assembly, the design of the purge valve then has to be as stated previously in order to allow it to open under the action of an air pressure equal to the inflation pressure of the mounted assembly on the radially interior surface of the piston which opposes the sum of the action of that same pressure on the radially external surface of the piston and of the action of the said compressible means. The purge valve then has a piston control surface area at least 10% greater than the area of the radially exterior surface of the piston in contact with the air enclosed in the cavity of the mounted assembly so that the purge valve remains in the open position until a pressure predetermined by the difference in the said cross sections and the stiffness of the compressible means is reached and/or the control force is increased by mechanical and/or hydraulic action supplementing the action of the air by way of a force acting on the radially interior surface of the piston in order to cause it to move.

The purge valve thus created according to an embodiment of the invention allows more rapid deflation, it being possible for its diameter and throughput to be adapted as required by the volume of the mounted assembly and its inflation pressure, without any risk to the operator.

Further, it also allows the addition of active and/or passive control systems which will make it possible to avoid any risk of driving with excessively high tire pressures and further limit the waiting times that currently exist when excessively high pressures arise, particularly with a view to limiting the risks that could lead to tire damage.

The purge valve according to an embodiment of the invention may also be provided either initially as original equipment at the time of design or manufacture of a new wheel; all that is required is for the wheel to have a drilling of the required dimension, the valve then being fitted into the said orifice. It may be attached by screwing the body of the purge valve into the thickness of the sheet metal of which the wheel is made, by clamping down onto the wheel two elements of the purge valve, for example two elements which are screwed together and which grip the said wheel. The simplicity of mounting also allows the valve according to an embodiment of the invention to be fitted to existing wheels, the only thing required being a simple additional drilling.

In the case of the design or manufacture of a new wheel, the body of the purge valve can alternatively be welded to the wheel and thus form an integral part of the wheel and contribute to its overall mechanical strength.

The piston is fixed to the internal mechanism of the valve, the assembly being advantageously fixed by screwing to the valve body. Because the piston is able to move towards the radially exterior part of the valve, it becomes accessible once the tire is not or no longer in place. The purge valve can thus easily be removed for maintenance, for example using devices such as holes for pin wrenches, a screwdriver slot, etc.; indeed it is particularly important to be able to clean it regularly because the said purge valve according to the invention is liable to collect particles in order to prevent them from being expelled violently from the cavity of the mounted assembly.

Another aspect of the invention is directed to a method of deflating a mounted assembly consisting of a wheel comprising a rim and of a tire, for a vehicle, using a purge valve comprising a body associated with the rim and a piston able to move with respect to the body between a closed position and a purge position, the valve being normally closed, the valve being opened by the action of a control force, exerted from the space radially internal to the rim.

BRIEF DESCRIPTION OF THE DRAWINGS

Further details and advantageous features of the invention will become evident hereinafter from the description of some exemplary embodiments of the invention with reference to the following drawings.

DETAILED DESCRIPTION OF THE DRAWINGS

In order to make them easier to understand, the figures have not been drawn to scale. FIGS. 1a, 1b, 3a and 3b depict only a half view of a purge valve, which extends symmetrically with respect to the axis XX'.

Figure 1A:
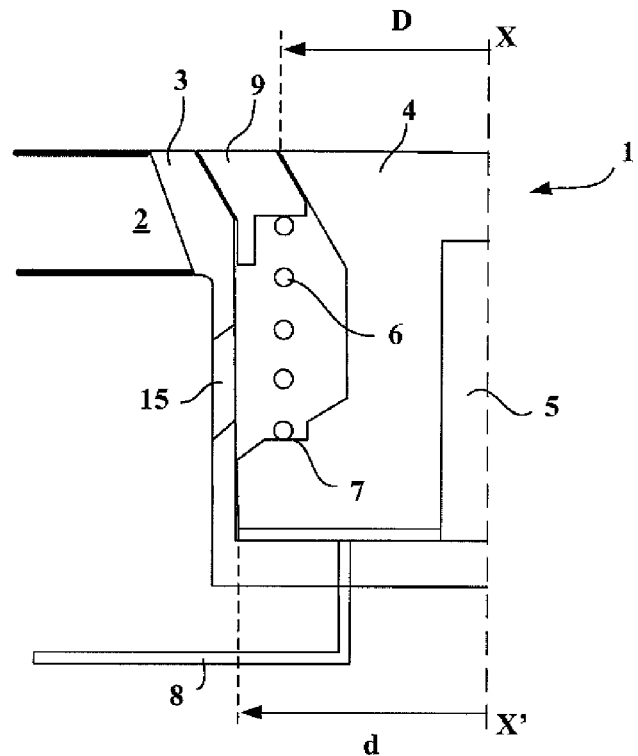
FIG. 1a, 1b: a schematic depiction of a purge valve according to a first embodiment of the invention, fixed to a rim.
Figure 1B:
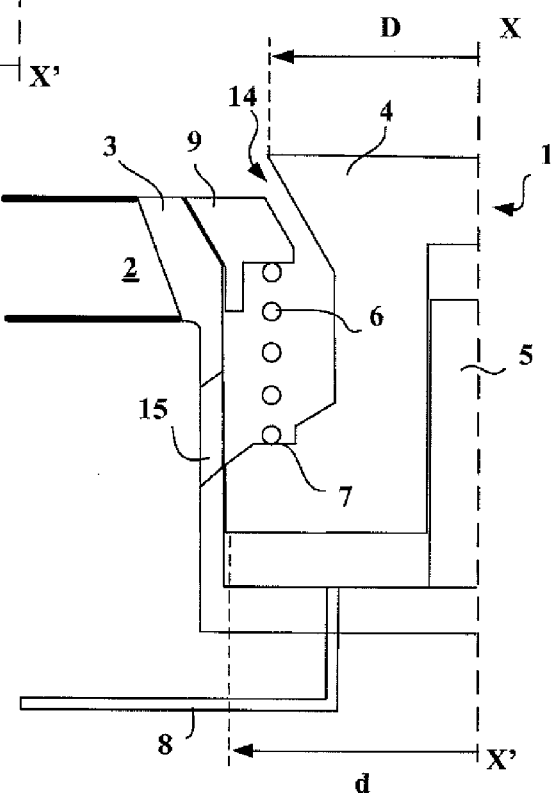

FIGS. 1a and 1b depict a diagram viewed in radial section of a purge valve 1 produced according to the invention and fixed into a rim 2 of a wheel of a mounted assembly. The purge valve 1, of substantially circular cross section in this example, consists in particular of a valve body 3 secured to the rim 2, for example by screwing it into a hole provided in the rim, and of a piston 4 itself associated with the valve body 3, for example by screwing via an additional mechanical part 5 internal to the valve body in order to make the said valve work.

In the case of FIGS. 1a and 1b, the design of the purge valve 1 is such that the area of the radially exterior surface of the piston 4 is smaller than the area of the radially interior surface of the piston 1; the diameter d of the control surface is, in the case of FIG. 1, greater than the diameter D of the radially exterior surface of the piston 4 which surface is itself in contact with the pressure of the inflation air of the mounted assembly.

In the depictions of FIGS. 1a and 1b, the purge valve 1 comprises an additional element 9 that makes it possible to reduce the radially external cross section of the piston 4. This additional element 9 is advantageously fixed by screwing onto the valve body 3. As the piston 4 moves, this piston uncovers a passage at this additional element 9, while at the same time remaining in contact with the valve body 3 in its radially interior part.

The various elements that make up the purge valve may be made of any materials that allow sufficient dimensional precision and rigidity to be achieved; this may be stainless steel, injection-moulded materials, etc.

For reasons of simplification, FIGS. 1a, 1b and the figures that follow them do not depict the seals required between the elements that are fixed together and between the elements that can move relative to one another. The invention requires a high level of sealing which can be obtained in ways known to those skilled in the art through the use of O-ring seals or metallic elastic gaskets between the wheel/valve body and/or valve body/piston connections or alternatively a sloping profile of the piston allowing metal-to-metal contact.

The fastening elements such as the regions of screw threads and regions allowing torque to be applied to the various constituent parts of the purge valve in order to separate them from one another have not been depicted in the figures either. In particular, FIG. 1 does not depict the means of mechanical coupling there might be between the piston 4 and the part 5 which will make it possible, by action on the piston 4, from the radially exterior zone of the rim, to detach the element 5 from the valve body 3, for example by turning the piston 4 in order to unscrew the piston 4 plus element 5 assembly.

The purge valve 1 according to the invention may, as previously mentioned, be fixed to a newly designed and/or manufactured rim (or wheel) in which a hole has been provided or alternatively to an existing rim (or wheel) in which a hole suited to the size of the purge valve needed for the mounted assembly.

The purge valve 1 further comprises a spring 6 compressed between, on the one hand, the additional element 9 and a part 7 of the piston 4. The compression and stiffness of the spring are predetermined so that the purge valve 1 is of the normally closed type as depicted in FIG. 1a, FIG. 1b illustrating the purge valve 1 in an open state.

FIGS. 1a and 1b also depict the duct 8 which carries the compressed air that will allow the piston 4 to move towards the zone radially external to the wheel and therefore allow the purge valve 1 to open. The compressed air carried by the duct 8 comes into contact with the radially internal surface of the piston 4, considered to be the control surface. The diameter d of this control surface is, in the case of FIG. 1, greater than the diameter D of the radially exterior surface of the piston 4 which is itself in contact with the pressure of the inflation air of the mounted assembly. The pressure of the compressed air carried as far as the control surface of the piston has therefore to be high enough to allow the piston 4 to move and may be lower than the inflation pressure of the mounted assembly, provided that the spring 6, and particularly the spring stiffness, is chosen accordingly. The pressure of the compressed air which is applied to the radially internal surface of the piston 4 has in actual fact to compensate for the combination of the force exerted by the inflation air on the radially external surface of the piston 4 and the force exerted by the spring 6.

Figures 2A, 2B:
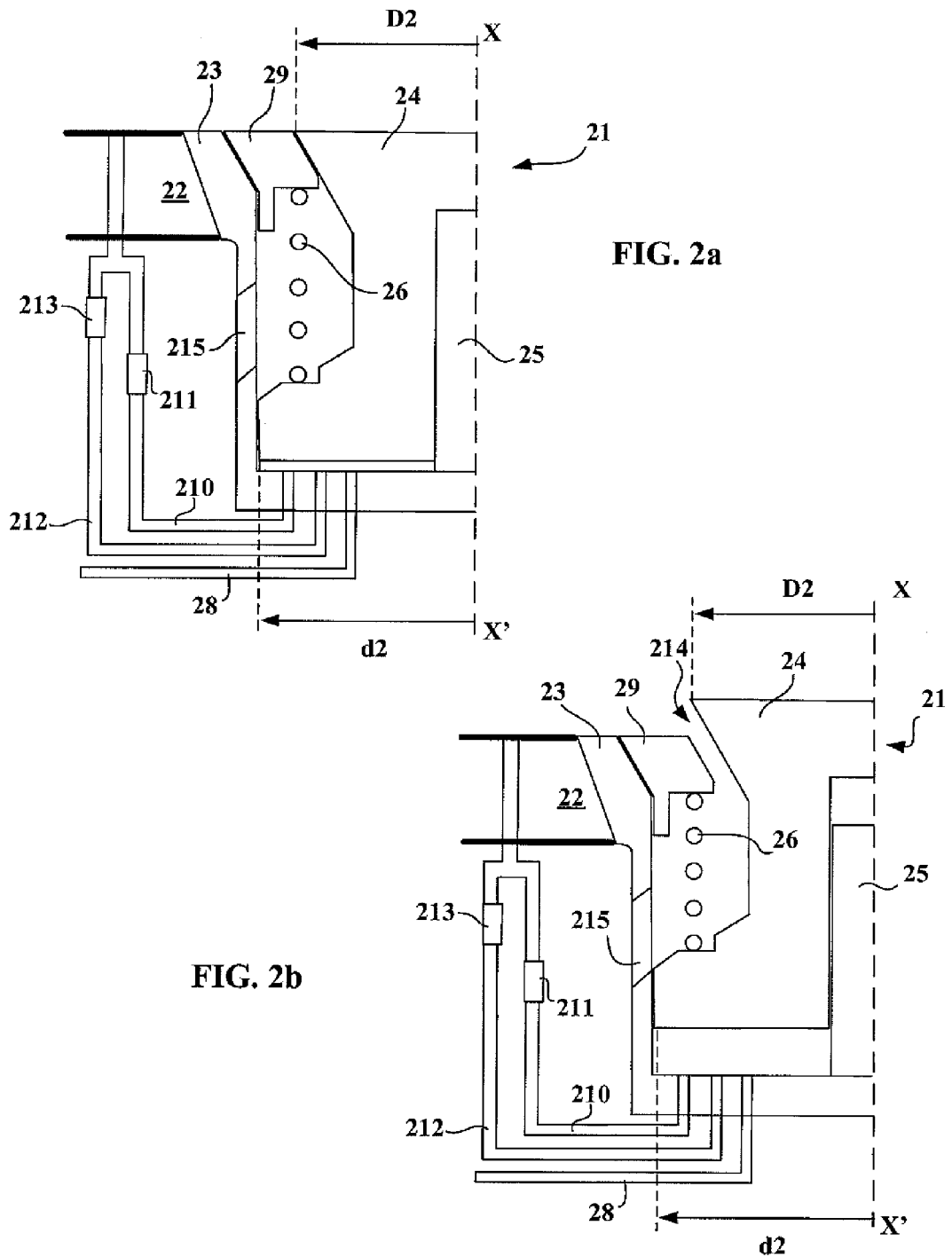
FIG. 2a, 2b: a schematic depiction of a purge valve according to a second embodiment of the invention, fixed to a rim.

FIGS. 2a, 2b illustrate a purge valve 21 similar to that of FIGS. 1a and 1b, to which passive and/or active control systems have been added to cause the purge valve to open as soon as a predefined threshold pressure is reached in the mounted assembly. It is possible for there to be a rise in pressure in the mounted assembly due, notably, to a rise in the temperature of the inflation air, for example on account of the tire or on account of the braking systems. It is preferable to avoid this type of increase in pressure, notably in order to preserve the integrity of the tire.

In the case of these FIGS. 2a and 2b, the design of the purge valve 21 is such that the area of the radially exterior surface of the piston 24 is smaller than the area of the radially interior surface of the piston 21; the diameter d2 of the control surface is, like in FIG. 1, greater than the diameter D2 of the radially exterior surface of the piston 24 which is itself in contact with the pressure of the inflation air of the mounted assembly. The piston 24 is also coupled with a part, so that it will make it possible, by action on the piston 24, from the radially exterior zone of the rim, to detach the element 25 from the valve body 23, for example by turning the piston 24 in order to unscrew the piston 24 plus element 25 assembly. Furthermore, the dimensions and stiffness of the spring 26 are chosen so that the action of a pressure higher than the predefined threshold pressure acting both on the radially exterior surface and on the radially interior surface of the piston 24 causes the purge valve 21 to open through a movement of the piston 24 towards the zone radially external to the rim 22.

In the depictions of FIGS. 2a and 2b, as in the case of FIGS. 1a and 1b, the purge valve 21 comprises an additional element 29 that makes it possible to reduce the radially external section of the piston 24. This additional element 29 is advantageously fixed by screwing to the valve body 23. As the piston 24 moves, it uncovers a passage at this additional element 29, while at the same time remaining in contact with the valve body 23 in its radially interior part.

The purge valve 21 is also associated with an additional duct 210 which connects via the radially interior surface of the piston 21 to the interior cavity formed by the mounted assembly. This duct 210 comprises a device 211 that closes off the passage for the air and is capable of opening as soon as the predetermined threshold pressure is reached; an element such as this is, for example, a diaphragm valve calibrated to rupture at the predefined pressure threshold. The device thus described constitutes a passive control system that limits the risks associated with increases in pressure of the mounted assembly.

In the case of FIGS. 2a and 2b, the choice of diameters D2 and d2 and of the dimension and stiffness of the spring will make it possible to define the final pressure of the mounted assembly once the threshold pressure is reached. One choice is, for example, to end up at a pressure of two bar which will allow the vehicle to return unladen and at low speed to a workshop either for repair or for reconditioning of this passive control device, for example by replacing the diaphragm valve.

The purge valve 21 also comprises another additional duct 212 which connects via the radially interior surface of the piston 21 to the interior cavity formed by the mounted assembly. This duct 212 is associated with a control 213 operated by an operator from the cab of the vehicle or alternatively situated to the side of the vehicle, the said control opening the duct 31 212 and therefore opening the purge valve 21 and therefore 25 allowing the mounted assembly to be deflated. This method of deflation which is controlled, because the operator starts and stops it as he wishes, constitutes an active control system.

In FIGS. 2a, 2b, the ducts 210 and 212 are connected into a single one to simplify the installation on the wheel with just one drilling. In other alternative forms of embodiment, the ducts may remain separate and the wheel then has an additional drilling.

Likewise, according to other alternative forms of embodiment which have not been depicted in the figures, the ducts 210 and 212 may be connected into a single one to simplify connection to the purge valve.

According to other alternative forms of embodiment, the devices 211 and 213 may be incorporated into the valve body 23; this alternative form of embodiment allows simpler installation particularly when the purge valve 21 is being installed on an existing wheel.

The ducts 210 and 212 advantageously contain non-return valves or equivalent devices to prevent the passage of the air carried by the duct 28. Likewise, the duct 28 may comprise a non-return valve to prevent the passage of the air carried by the ducts 210 and 212.

Figures 3A, 3B:
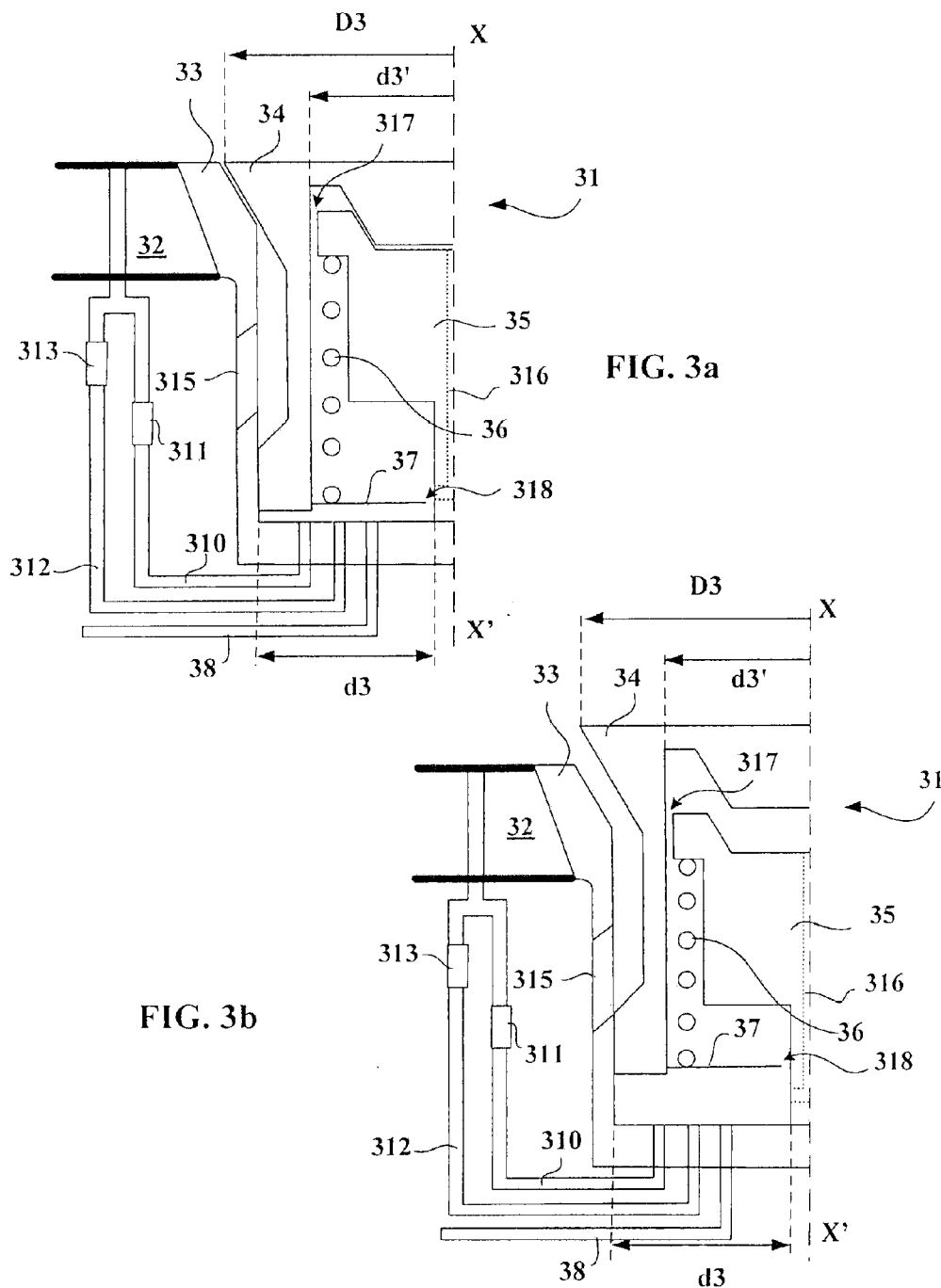
FIG. 3a, 3b: a schematic depiction of a purge valve according to a third embodiment of the invention, fixed to a rim.

FIGS. 3a, 3b also illustrate a purge valve 31 that allows for the addition of passive and/or active control systems.

In the case of these FIGS. 3a and 3b, the design of the purge valve 31 is such that the area of the radially exterior surface of the piston 34 is smaller than the area of the control surface of the piston 31. The depiction given in FIGS. 3a, 3b involves increasing the area of the control surface of the piston 31 by combining two surfaces identified by the dimensions d3 and d3'; to do that, control air arriving in a zone of the valve 31 by the duct 38 that corresponds to the control surface identified by the dimension d3 is also carried by a passage 316 provided in the element 35 secured to the valve body 33 as far as a zone corresponding to the control surface identified by the dimension d3'. The combined action of these two control surfaces is also notably assured by a sealing means at the zones 317 and 318 of friction between the piston 34 and the element 35, and between the elements 37 and 35, respectively. The overall dimension (d3+d3') of the overall control surface is thus, in the case of FIG. 3, greater than the dimension D3 of the radially exterior surface of the piston 34 which is itself in contact with the pressure of the inflation air of the mounted assembly. Further, as in the case of FIG. 2, the dimensions and stiffness of the spring 36 are chosen so that the action of a pressure higher than the predefined threshold pressure acting both on the radially exterior surface and on the control surface of the piston 34 causes the purge valve 31 to open through a movement of the piston 34 towards the zone radially external to the rim 32.

As in the case of FIGS. 2a, 2b, the purge valve may comprise active (312, 313) and/or passive (310, 311) control devices.

The opening of the purge valve 1, 21, 31, whether in the case of FIG. 1b, 2b or 3b, leads to the creation of an annular orifice 14, 214 within the cavity of the mounted assembly enclosing the inflation air. This annular orifice is designed to offer an air outlet surface area that is large enough to considerably reduce the deflation times by comparison with the present-day solutions while at the same time locally limiting the dimension of the orifice in order to restrict the passage of solid particles contained in the mounted assembly and which could consist of projectiles carried by the stream of deflation air.

Flow inside the purge valve is advantageously optimized by a progressive connection at the bottom end of the piston and a flush position with the discharge orifices 15, 215, 315, as shown by the figures, so as to limit the pressure drops in the air discharged and prevent the creation of turbulence.

The air carried by this annular orifice is then discharged through one or more orifices 5, 215, 315 of limited cross sections in order further to filter out any solid particles in suspension.

Increasing the number of these orifices 5, 215 on the periphery of the purge valve 1, 21 allows their cross sections to be reduced without limiting the total air flow rate discharged.

Furthermore, increasing the number of these jets may make it possible to limit the noise level generated by the release of the air under pressure. It is also possible to associate devices of the silencer type around the purge valve 1, 21 in order further to limit the noise.

The invention may also exhibit alternative forms of embodiment which have not been depicted in the figures, making it possible to reduce the noise as the air is discharged; for example, the outlet orifice or orifices may be designed to form a primary layer of air representing at least 60% of the flow rate, surrounded by small jets which impact on the primary layer and/or create a low velocity layer around the primary layer.

Whatever the embodiment of the purge valve, in its closed position, it advantageously has no element raised relative to the surface of the rim in which it is fixed in its radially exterior part; in other words, it does not protrude from the radially exterior surface of the rim. A configuration such as this ensures that the passage of the beads of the tires or alternatively of a ring that makes up the wheel is not impeded when the mounted assemblies are being fitted or removed.

Figure 4:
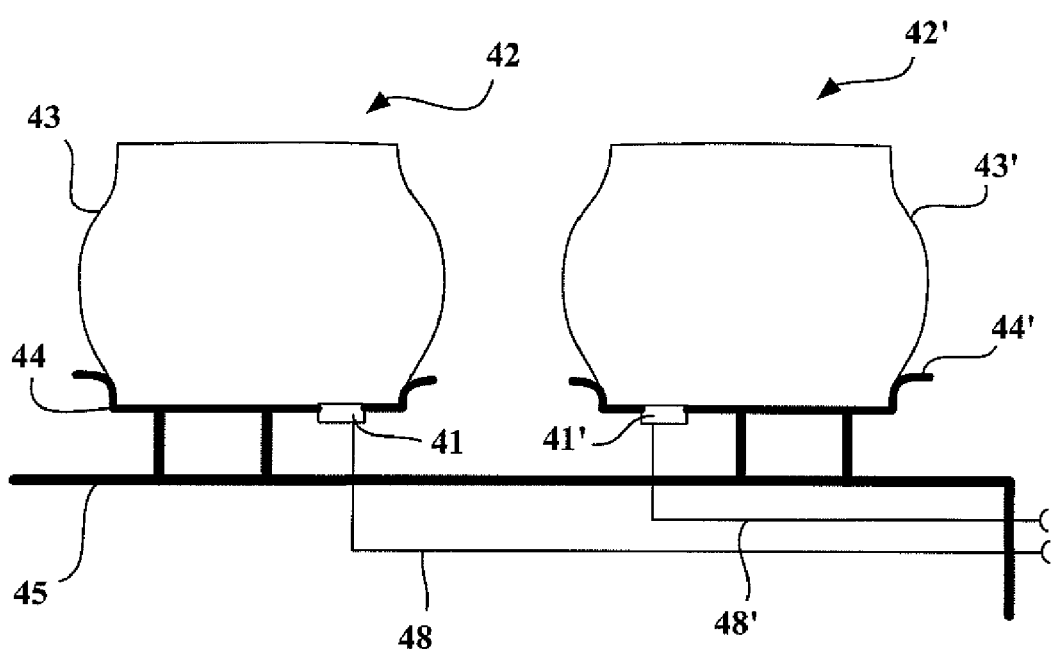
FIG. 4: a schematic depiction of purge valves according to the invention, fixed to twin mounted assemblies.

FIG. 4 illustrates the combination of two twin mounted assemblies 42, 42' consisting of tires 43, 43' and of wheels 44, 44' each comprising purge valves 41, 41'. The to mounted assemblies are fixed to an axle 45. The purge valves 41, 41' are advantageously positioned in the space lying between the mounted assemblies so that as the air is discharged it is expelled into this space and therefore away from an operator.

This FIG. 4 depicts only ducts 48, 48' allowing an operator to connect a compressor with air at a pressure that will allow the purge valves 41, 41' to be opened.

Deflation tests have been carried out on mounted assemblies comprising tires of the 59/80R63 and 44/80R57 sizes. The tests were carried out on mounted assemblies comprising a purge valve according to the invention.

Other tests were carried out on the same mounted assemblies deflating in the customary way using the inflation valve.

The results obtained are set out in the following table:

|  | 59/80R63 | 44/80R57 |
|---|---|---|
| Deflation using the purge valve according to the invention | 3.20 min | 2 min |

|  | 59/80R63 | 44/80R57 |
|---|---|---|
| Deflation using the inflation valve | 42 min | 28 min |

These results show, apart from the advantages in terms of simplicity and safety, that the deflation times obtained according to the invention are very much shorter than the customary times and can lead to appreciable increases in terms of vehicle productivity.

The purge valve according to the invention is particularly attractive for large-sized mounted assemblies for applications of the civil engineering works type. The valve can also be used for any type of mounted assembly such as mounted assemblies for heavy goods vehicles, particularly those intended to be fitted to vehicles as a single fit in place of twin mounted assemblies, mounted assemblies for vehicles of the agricultural type, particularly those of a large size with a low inflation pressure, etc.

The invention claimed is:

1. A purge valve for a mounted assembly for a vehicle consisting of a wheel comprising a rim and of a tire, the valve comprising:
   a body positioned into the rim; and
   a piston able to move with respect to said body between a closed position and a purge position, the valve being normally closed, and the piston being configured to be movable into a space radially external to the rim in order to open the valve,
   wherein opening of the valve is obtained by action of a control force on the piston, exerted from a space radially internal to the rim, and provided at least in part by compressed air led from the space radially internal to the rim to a radially interior surface of the piston, and
   wherein the compressed air led from the space radially internal to the rim to the radially interior surface of the piston is at a pressure lower than or equal to that of the mounted assembly.

2. The purge valve according to claim 1, wherein the ratio of the area of the control surface to the area of the radially exterior surface of the piston is greater than or equal to 110%.

3. The purge valve according to claim 1, wherein the control force is increased by a mechanical and/or hydraulic and/or electrical device.

4. The purge valve according to claim 1, wherein, in its open position, the valve creates an annular discharge section within the space radially external to the rim in the tire cavity.

5. The purge valve according to claim 1, wherein the valve releases the air into the space radially internal to the rim through at least one orifice.

6. The purge valve according to claim 5, wherein the orifice has at least one characteristic dimension shorter than 10 mm.

7. The purge valve according to claim 1, wherein the valve comprises a control system for moving the piston into the purge position as soon as the tire pressure exceeds a threshold pressure.

8. The purge valve according to claim 7, comprising a compressible means ensuring the normally-closed position, and a control system of the passive type and in that the tire pressure keeps the valve open until a pressure defined by the compressible means is reached.

9. The purge valve according to claim 7, wherein the valve comprises a control system of the active type, and the tire pressure keeps the valve open via an operator control.

10. The purge valve according to claim 1, for a mounted assembly for a vehicle of the dumper type.

11. A method of deflating a mounted assembly consisting of a wheel comprising a rim and of a tire, for a vehicle, using a purge valve comprising a body positioned into the rim and a piston, having a radially interior surface, able to move with respect to the body between a closed position and a purge position, the valve being normally closed, the method comprising the steps of:
   opening the valve by the action of a control force, exerted from a space radially internal to the rim, and provided at least in part by compressed air led from the space radially internal to the rim to the radially interior surface of the piston, the opening of the valve including moving the piston into a space radially external to the rim, and
   wherein the compressed air led from the space radially internal to the rim to the radially interior surface of the piston is at a pressure lower than or equal to that of the mounted assembly.

* * * * *